(12) United States Patent
Takashima

(10) Patent No.: US 8,874,861 B2
(45) Date of Patent: Oct. 28, 2014

(54) SYSTEM AND METHOD OF COPYING ELECTRONIC DOCUMENT AND CHANGE HISTORY INFORMATION

(75) Inventor: Taro Takashima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 863 days.

(21) Appl. No.: 13/016,835

(22) Filed: Jan. 28, 2011

(65) Prior Publication Data
US 2012/0017056 A1 Jan. 19, 2012

(30) Foreign Application Priority Data

Jul. 16, 2010 (JP) ................................. 2010-161394

(51) Int. Cl.
*G06F 13/00* (2006.01)
*G06F 17/30* (2006.01)

(52) U.S. Cl.
CPC ................................ *G06F 17/30011* (2013.01)
USPC ............................ 711/162; 711/154; 711/156

(58) Field of Classification Search
USPC ......................................... 711/154, 156, 162
See application file for complete search history.

(56) References Cited

U.S. PATENT DOCUMENTS

| | | | |
|---|---|---|---|
| 6,216,140 B1 | 4/2001 | Kramer | |
| 6,567,823 B1 * | 5/2003 | Rothschild | 707/104.1 |
| 6,944,630 B2 * | 9/2005 | Vos et al. | 707/104.1 |
| 2002/0087587 A1 * | 7/2002 | Vos et al. | 707/203 |
| 2007/0214334 A1 * | 9/2007 | Maruyama et al. | 711/165 |
| 2008/0052265 A1 * | 2/2008 | Vos et al. | 707/1 |
| 2009/0106305 A1 | 4/2009 | Murakami | |
| 2009/0300037 A1 * | 12/2009 | Kariv | 707/101 |

FOREIGN PATENT DOCUMENTS

| | | |
|---|---|---|
| JP | 05-324438 A | 12/1993 |
| JP | 2002-259175 A | 9/2002 |
| JP | 2002-334088 A | 11/2002 |

* cited by examiner

*Primary Examiner* — Reba I Elmore
(74) *Attorney, Agent, or Firm* — Sughrue Mion, PLLC

(57) ABSTRACT

A computer readable medium stores a program causing a computer to execute a process. The process includes receiving from a user a request for performing a process for copying information; executing the process for copying information in accordance with the received request; and performing control to determine whether or not copied information and a change history of original information from which the copied information is produced are to be stored in a memory in association with each other, when the process for copying information is executed, in accordance with whether or not a relationship between information relating to a user associated with the original information and information relating to a user who has made the request for performing the process for copying information satisfies a predetermined condition.

3 Claims, 23 Drawing Sheets

FIG. 5

| OBJECT ENTRY IDENTIFIER EID | FIRST HISTORY IDENTIFIER F_RID | LATEST HISTORY IDENTIFIER L_RID | OBJECT NAME NAME | PARENT OBJECT ENTRY IDENTIFIER P_EID |
|---|---|---|---|---|
| Eroot | NULL | NULL | Nroot | NULL |
| Efa | NULL | NULL | Nfa | Eroot |
| Efb | NULL | NULL | Nfb | Eroot |
| Efc | NULL | NULL | Nfc | Eroot |

34

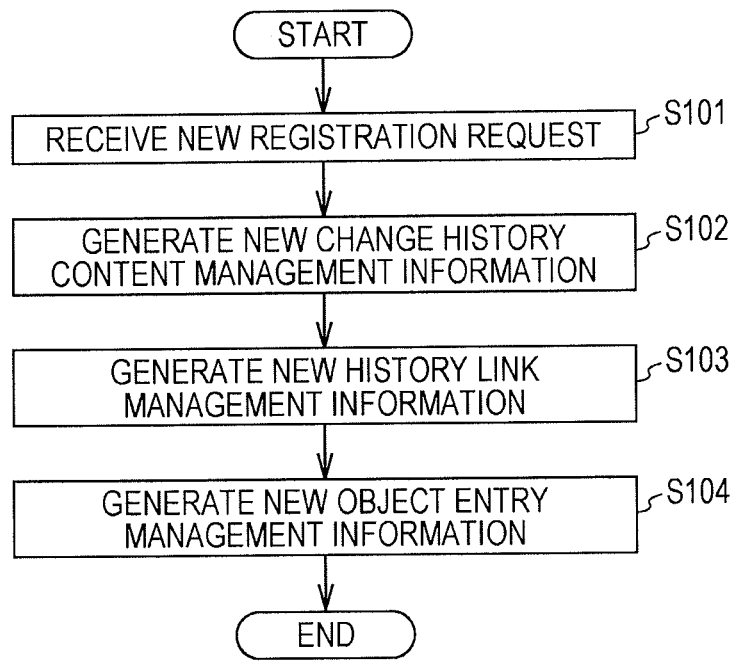

FIG. 18

| HISTORY IDENTIFIER RID | HISTORY CONTENT INFORMATION CONTENT |
|---|---|
| R1 | C1 |
| R2 | C2 |
| R3 | C3 |
| R4 | C4 |
| R5 | C5 |

FIG. 19

| OBJECT ENTRY IDENTIFIER EID | FIRST HISTORY IDENTIFIER F_RID | LATEST HISTORY IDENTIFIER L_RID | OBJECT NAME NAME | PARENT OBJECT ENTRY IDENTIFIER P_EID |
|---|---|---|---|---|
| Eroot | NULL | NULL | Nroot | NULL |
| Efa | NULL | NULL | Nfa | Eroot |
| Efb | NULL | NULL | Nfb | Eroot |
| Efc | NULL | NULL | Nfc | Eroot |
| Ea | R1 | R3 | Na | Efa |
| Eb | R1 | R4 | Na | Efb |
| Ec | R1 | R5 | Na | Efc |

| HISTORY IDENTIFIER RID | PRECEDING HISTORY IDENTIFIER P_RID | NUMBER OF LINKS USED COUNT |
|---|---|---|
| R1 | NULL | 3 |
| R2 | R1 | 3 |
| R3 | R2 | 1 |
| R4 | R2 | 2 |
| R5 | R4 | 1 |

SYSTEM AND METHOD OF COPYING ELECTRONIC DOCUMENT AND CHANGE HISTORY INFORMATION

CROSS-REFERENCE TO RELATED APPLICATIONS

This application is based on and claims priority under 35 USC 119 from Japanese Patent Application No. 2010-161394 filed Jul. 16, 2010.

BACKGROUND (i) Technical Field

The present invention relates to a computer readable medium storing a program, an information processing apparatus, and an information processing method.

(ii) Related Art

There are information processing systems configured to store information such as electronic documents in association with the history of changes made to the information.

SUMMARY

According to an aspect of the invention, there is provided a computer readable medium storing a program causing a computer to execute a process. The process includes receiving from a user a request for performing a process for copying information; executing the process for copying information in accordance with the received request; and performing control to determine whether or not copied information and a change history of original information from which the copied information is produced are to be stored in a memory in association with each other, when the process for copying information is executed, in accordance with whether or not a relationship between information relating to a user associated with the original information and information relating to a user who has made the request for performing the process for copying information satisfies a predetermined condition.

BRIEF DESCRIPTION OF THE DRAWINGS

Exemplary embodiment(s) of the present invention will be described in detail based on the following figures, wherein:

FIG. 5 illustrates an example of object entry management information;

FIG. 6 illustrates an example of history link management information;

FIG. 7 is a flowchart illustrating an example of a flow of a new object information registration process performed by the information processing apparatus according to the exemplary embodiment;

FIG. 18 illustrates an example of change history content management information;

FIG. 19 illustrates an example of object entry management information;

FIG. 20 illustrates an example of history link management information;

DETAILED DESCRIPTION

An exemplary embodiment of the present invention will be described in detail hereinafter with reference to the drawings.

Figure 1:
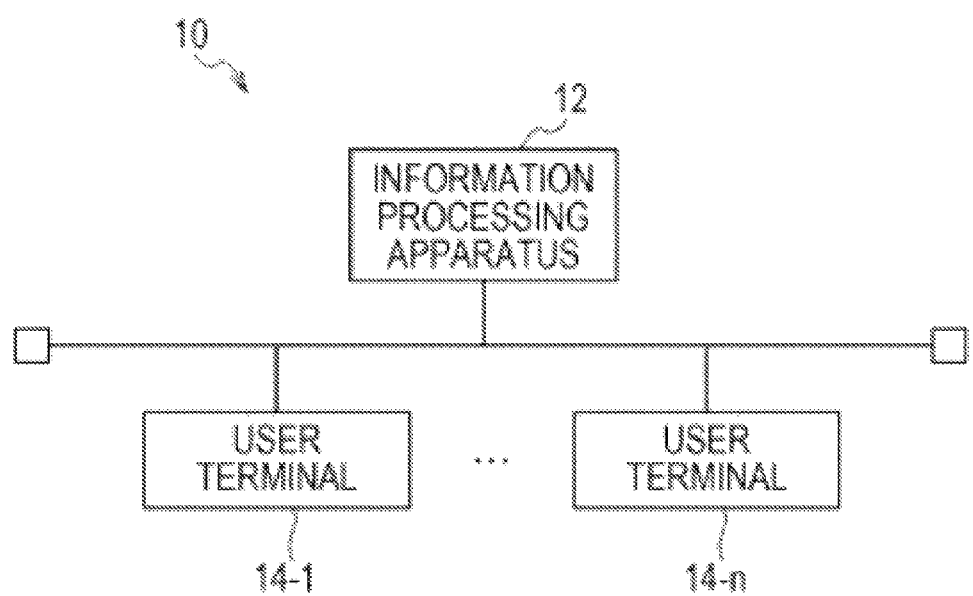
FIG. 1 illustrates an example of the hardware configuration of an information processing system according to an exemplary embodiment of the present invention.

FIG. 1 illustrates an example of the hardware configuration of an information processing system 10 according to the exemplary embodiment. As illustrated by way of example in FIG. 1, the information processing system 10 according to the exemplary embodiment includes an information processing apparatus 12 and user terminals (clients) 14 (14-1 to 14-n ). The information processing apparatus 12 and the user terminals 14 may be connected to a communication medium such as a local area network (LAN) or the Internet so as to communicate with one another.

The information processing apparatus 12 includes, for example, a controller serving as a program control device such as a central processing unit (CPU) that operates in accordance with a program installed in the information processing apparatus 12, a storage unit which may be a storage element such as a read-only memory (ROM) or a random access memory (RAM), a hard disk drive, or the like, a communication unit which may be a communication interface such as a network board, and any other suitable device. The above components are connected to one another via a bus. The storage unit of the information processing apparatus 12 stores a program executed by the controller of the information processing apparatus 12. The storage unit of the information processing apparatus 12 also operates as a work memory of the information processing apparatus 12.

Each of the user terminals 14 may be a known personal computer including, for example, a control device such as a CPU, a storage device which may be a storage element such as a ROM or a RAM, a hard disk drive, or the like, an output device such as a display, an input device such as a mouse or a keyboard, a communication device such as a network board, and any other suitable device.

Figure 2:
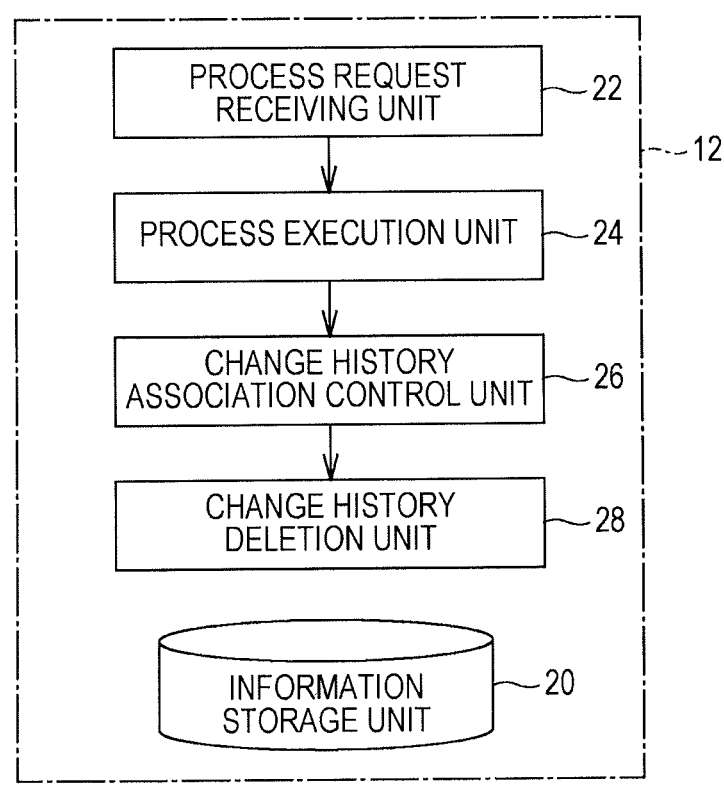
FIG. 2 is a functional block diagram illustrating an example of functions implemented by an information processing apparatus according to an exemplary embodiment of the present invention.

FIG. 2 is a functional block diagram illustrating an example of functions which may be implemented by the information processing apparatus 12 according to the exemplary embodiment. As illustrated by way of example in FIG. 2, in this exemplary embodiment, the information processing apparatus 12 includes, for example, an information storage unit 20, a process request receiving unit 22, a process execution unit 24, a change history association controller 26, and a change history deletion unit 28. The information storage unit 20 may be implemented using the storage unit of the information processing apparatus 12. The other components implemented using the controller of the information processing apparatus 12.

The above components are implemented by executing, using the controller of the information processing apparatus 12, the program installed in the information processing apparatus 12 which may be a computer. The program may be supplied to the information processing apparatus 12 via, for example, a computer-readable information storage medium such as a compact disc read-only memory (CD-ROM) or a digital versatile disc read-only memory (DVD-ROM) or via a communication medium such as the Internet.

Figure 3:
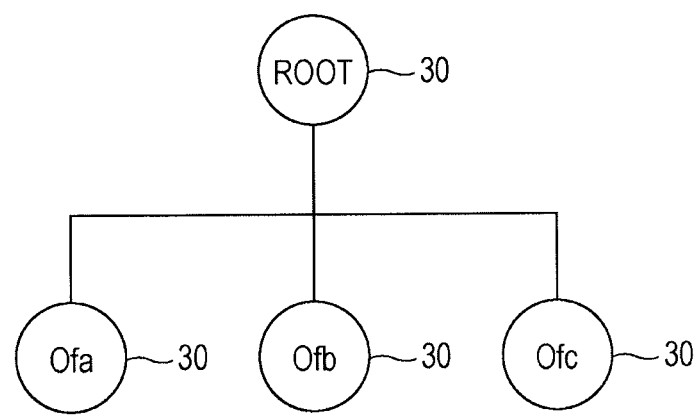
FIG. 3 schematically illustrates an example of object information.

The information storage unit 20 stores, for example, plural pieces of object information 30 illustrated by way of example in FIG. 3. FIG. 3 schematically illustrates examples of object information 30. The object information 30 may be, for example, information indicating a document or a folder. As illustrated in FIG. 3, in this exemplary embodiment, the information storage unit 20 stores, for example, four pieces of object information 30 (an object ROOT, an object Ofa, an object Ofb, and an object Ofc) in advance. In this exemplary embodiment, object information 30 includes, for example, object request process content information indicating the content of a process requested for the object information 30 (for example, the date and time of execution of the process, the user who has made a request for performing the process, and information indicating the process requested), and object element information indicating the content and attribute of the object (for example, the content of the object information 30 (such as a document or an image), an author, an authorizer, and a page size).

The object information 30 may be, for example, data having a hierarchical structure (for example, a tree structure). Further, the object information 30 is stored in the information storage unit 20 in association with, for example, information indicating the history of changes made to the object information (hereinafter referred to as "change history of object information" or "change histories of object information") 30. In this exemplary embodiment, a change history of the object information 30 may be represented by, for example, change history content management information 32 (see FIGS. 4 and 18), object entry management information 34 (see FIGS. 5 and 19), and history link management information 36 (see FIGS. 6 and 20), described below.

Figure 4:
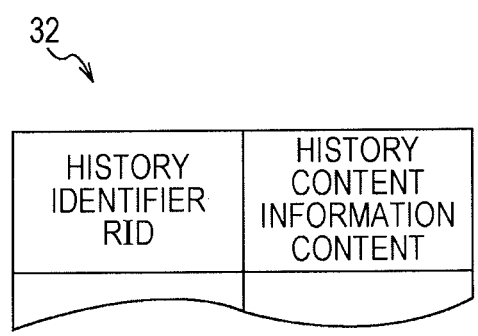
FIG. 4 illustrates an example of change history content management information.

FIG. 4 illustrates an example of the change history content management information 32 for managing the content of a change history of the object information 30. FIG. 4 illustrates an example of initial change history content management information 32 in this exemplary embodiment. As illustrated in FIG. 4, the change history content management information 32 may be, for example, data having a table structure. The change history content management information 32 includes, for example, a history identifier RID which may be a value uniquely identifying a change history, and history content information CONTENT indicating the content of a change made to the object information 30 (in this exemplary embodiment, for example, the content of a changed object).

FIG. 5 illustrates an example of the object entry management information 34 for managing a relationship (such as parent-child relationship) between pieces of object information 30 and a correspondence relationship between object information 30 and change history content management information 32. FIG. 5 illustrates an example of initial object entry management information 34 in this exemplary embodiment. As illustrated in FIG. 5, the object entry management information 34 may be, for example, data having a table structure. The object entry management information 34 includes, for example, an object entry identifier EID which may be a value uniquely identifying the object information 30, a first history identifier F_RID which may be a value of the history identifier RID corresponding to the first (for example, initial) change history of the object information 30, a latest history identifier L_RID which may be a value of the history identifier RID corresponding to the latest change history of the object information 30, an object name NAME indicating the name of the object information 30, and a parent object entry identifier P_EID which may be the value of the object entry identifier EID of the parent object information 30.

In this exemplary embodiment, as illustrated by way of example in FIG. 5, in an initial state, for example, the object entry management information 34 corresponding to the object ROOT (with the object entry identifier EID having a value Eroot and the object name NAME having a value Nroot), the object Ofa (with the object entry identifier EID having a value Efa and the object name NAME having a value Nfa), the object Ofb (with the object entry identifier EID having a value Efb and the object name NAME having a value Nfb), and the object Ofc (with the object entry identifier EID having a value Efc and the object name NAME having a value Nfc) are stored in the information storage unit 20. In this exemplary embodiment, furthermore, for example, the objects Ofa, Ofb, and Ofc are assumed to be pieces of child object information 30 of the object ROOT.

FIG. 6 illustrates an example of the history link management information 36 for managing a temporal (before-after) relationship between change histories of object information 30. FIG. 6 illustrates an example of initial history link management information 36 in this exemplary embodiment. As illustrated in FIG. 6, the history link management information 36 may be, for example, data having a table structure. The history link management information 36 includes, for example, the history identifier RID described above, a preceding history identifier P_RID which may be a value of the history identifier RID of the preceding change history, and the number of links used COUNT indicating the number of pieces of object information 30 for which the relationship between change histories is managed using the history link management information 36.

Here, an overview of a process performed by the information processing apparatus 12 according to the exemplary embodiment will be described.

In this exemplary embodiment, for example, the process request receiving unit 22 receives from a user terminal 14 a request for processing object information 30 (for example, a request for registering new object information 30, a request for obtaining object information 30, a request for changing the content of object information 30, a request for changing an attribute of object information 30, a request for copying object information 30, a request for deleting object information 30, a request for obtaining a list of pieces of object information 30, or a request for obtaining a history list of object information 30). The process execution unit 24 executes a process for which a request has been received by the process request receiving unit 22 (for example, a process for registering new object information 30, a process for outputting object information 30, a process for changing the content of object information 30, a process for changing an attribute of object information 30, a process for copying object information 30, a process for deleting object information 30, a process for outputting a list of pieces of object information 30, or a process for outputting a history list of object information 30).

In this exemplary embodiment, for example, when the process execution unit 24 executes a process for changing or copying object information 30, the change history association controller 26 determines whether the process is of a derivative type or a use type in accordance with whether or not a predetermined condition is satisfied. In this manner, in this exemplary embodiment, for example, the changing or copying process executed by the process execution unit 24 is classified into the derivative type or the use type.

In this exemplary embodiment, for example, if the change history association controller 26 determines that the process executed by the process execution unit 24 is a derivative-type changing process, object information 30 is associated with a change history of the object information 30. If the change history association controller 26 determines that the process executed by the process execution unit 24 is a use-type changing process, control is performed so that the object information 30 is not associated with a change history of the object information 30 (for example, association is released).

In this exemplary embodiment, furthermore, for example, if the change history association controller 26 determines that the process executed by the process execution unit 24 is a derivative-type copying process, copied object information 30 is associated with a change history of the original object information 30 from which the copied object information 30 is produced. If the change history association controller 26 determines that the process executed by the process execution unit 24 is a use-type copying process, control is performed so that copied object information 30 is not associated with a change history of the original object information 30 from which the copied object information 30 is produced (for example, association is released).

For example, if the process executed by the process execution unit 24 does not include a process for changing the name (name attribute) of object information 30, the change history association controller 26 determines that the process is of the derivative type. If the process executed by the process execution unit 24 includes a process for changing the name (name attribute) of object information 30, the change history association controller 26 determines that the process is of the use type.

That is, if the process execution unit 24 executes only a process for copying object information 30 but does not change the name of copied object information 30 from the name of the original object information 30 from which the copied object information 30 is produced, the change history association controller 26 determines that the process is a derivative-type process, and associates the copied object information 30 with a change history of the original object information 30. If the process execution unit 24 executes a process for copying object information 30 and changes the name (name attribute) of copied object information 30 from the name of the original object information 30 from which the copied object information 30 is produced, the change history association controller 26 determines that the process is a use-type process, and does not associate the copied object information 30 with a change history of the original object information 30 (for example, releases association).

Derivative-type processes may be suitable for, for example, the addition or correction of the content of the original object information 30 without changing the purpose of use (specifically, for example, for changing the version or revision in document management). In contrast, use-type processes may be suitable for the reuse of the content of object information 30 for other purposes of use (specifically, for example, for creating a manual based on the content of a functional specifications document).

A specific example of a process performed by the information processing apparatus 12 in this exemplary embodiment will be described hereinafter.

New Registration Process

First, an example of a flow of a process for registering new object information 30, which is performed by the information processing apparatus 12 according to the exemplary embodiment, will be described with reference to a flowchart illustrated in FIG. 7. The description will be given here of an example of a flow of a process for registering a new object Oa. In the illustrated example process, it is assumed that the four pieces of object information 30 illustrated by way of example in FIG. 3, the change history content management information 32 illustrated by way of example in FIG. 4, the object entry management information 34 illustrated by way of example in FIG. 5, and the history link management information 36 illustrated by way of example in FIG. 6 are stored in the information storage unit 20.

First, the process request receiving unit 22 receives from a user terminal 14 a request for registering a new object Oa as child object information 30 of the object Ofa (S101). Here, the object Oa has content C1 and name Na.

Then, the process execution unit 24 generates new change history content management information 32 (S102) in which a new value R1 is set in the history identifier RID and in which the content C1 is set in the history content information CONTENT. The process execution unit 24 determines the value R1 of the history identifier RID in accordance with, for example, the date and time of receipt of the request received in S101, the sequence number uniquely generated by the process execution unit 24, and any other suitable value.

Then, the change history association controller 26 generates new history link management information 36 (S103) in which the value R1 is set in the history identifier RID, a value "null" is set in the preceding history identifier P_RID, and a value "1" is set in the number of links used COUNT.

Then, the process execution unit 24 generates new object entry management information 34 (S104) in which a new value Ea is set in the object entry identifier EID, the value R1 is set in the first history identifier F_RID, the value R1 is set in the latest history identifier L_RID, the name Na of the object Oa is set in the object name NAME, and an object entry identifier Efa of the object Ofa that is the parent object information 30 of the object Oa is set in the parent object entry identifier P_EID. The process execution unit 24 determines the value R1 of the history identifier RID in accordance with, for example, the date and time of receipt of the request received in S101, the sequence number uniquely generated by the process execution unit 24, and any other suitable value.

Figure 8:
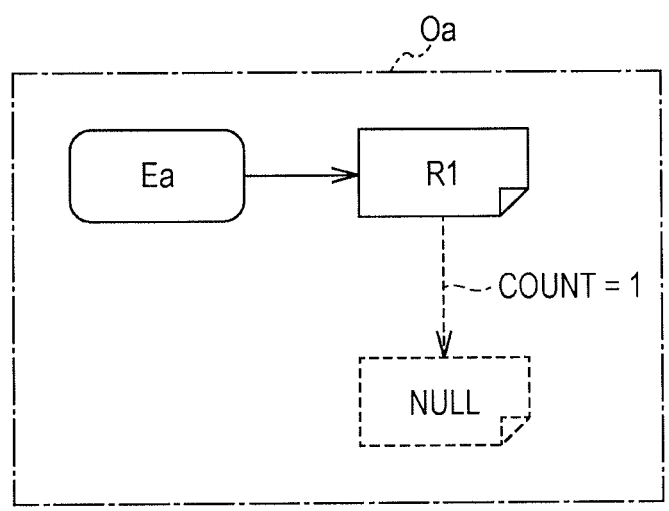
FIG. 8 schematically illustrates an example of the state of an object Oa that is registered.

The object Oa is registered in this way. FIG. 8 schematically illustrates an example of the state of the object Oa registered at this time.

Changing Process

Figure 9:
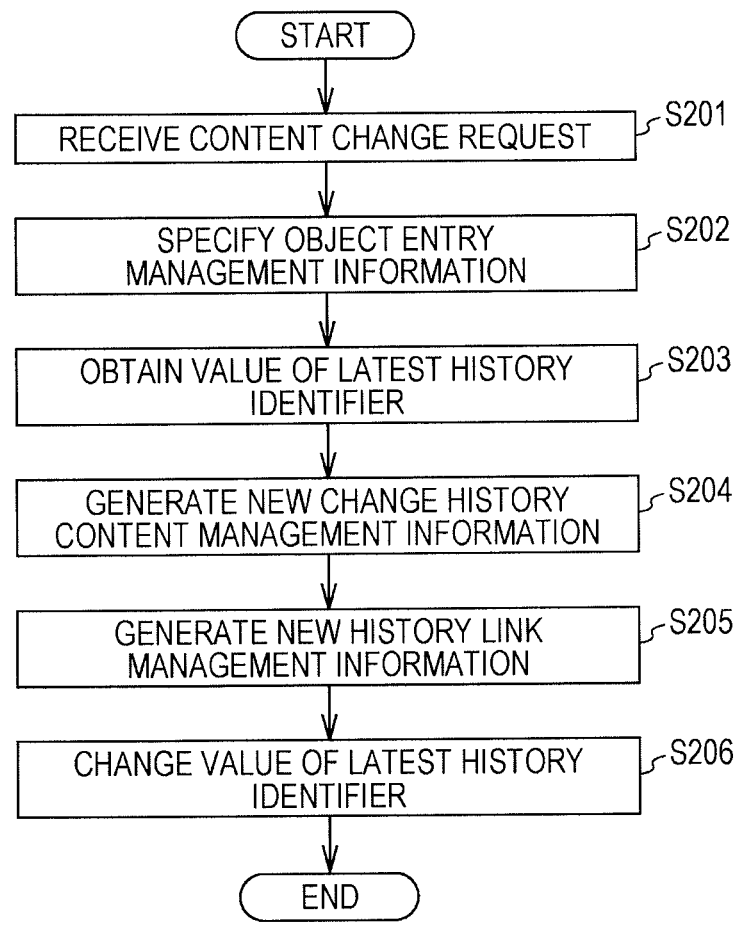
FIG. 9 is a flowchart illustrating an example of a flow of a object information content changing process performed by the information processing apparatus according to the exemplary embodiment.

Next, an example of a flow of a process for changing the content of object information 30, which is performed by the information processing apparatus 12 according to the exemplary embodiment, will be described with reference to a flowchart illustrated in FIG. 9. The description will be given here of an example of a flow of a derivative-type changing process for changing the content of the object Oa. In the illustrated example process, it is assumed that the object Oa is in the state illustrated by way of example in FIG. 8.

First, the process request receiving unit 22 receives from a user terminal 14 a request for changing the content of the object Oa from C1 to C2 (S201). Then, the process execution unit 24 specifies object entry management information 34 corresponding to the object Oa (for example, object entry management information 34 in which the object entry identifier EID has a value Ea) (S202).

Then, the process execution unit 24 obtains the value R1 of the latest history identifier L_RID included in the object entry management information 34 in which the object entry identifier EID has the value Ea (S203).

Then, the process execution unit 24 generates new change history content management information 32 (S204) in which a new value R2 is set in the history identifier RID and in which the content C2 is set in the history content information CONTENT. The process execution unit 24 determines the value R2 of the history identifier RID in accordance with, for example, the date and time of receipt of the request received in S201, the sequence number uniquely generated by the process execution unit 24, and any other suitable value.

Then, the change history association controller 26 generates new history link management information 36 (S205) in which the value R2 is set in the history identifier RID, the value R1 obtained by the process execution unit 24 in the processing of S203 is set as the value of the preceding history identifier P_RID, and the value "1" is set in the number of links used COUNT.

Then, the process execution unit 24 changes the value of the latest history identifier L_RID included in the object entry management information 34 in which the object entry identifier EID has the value Ea to R2 (S206).

Figure 10:
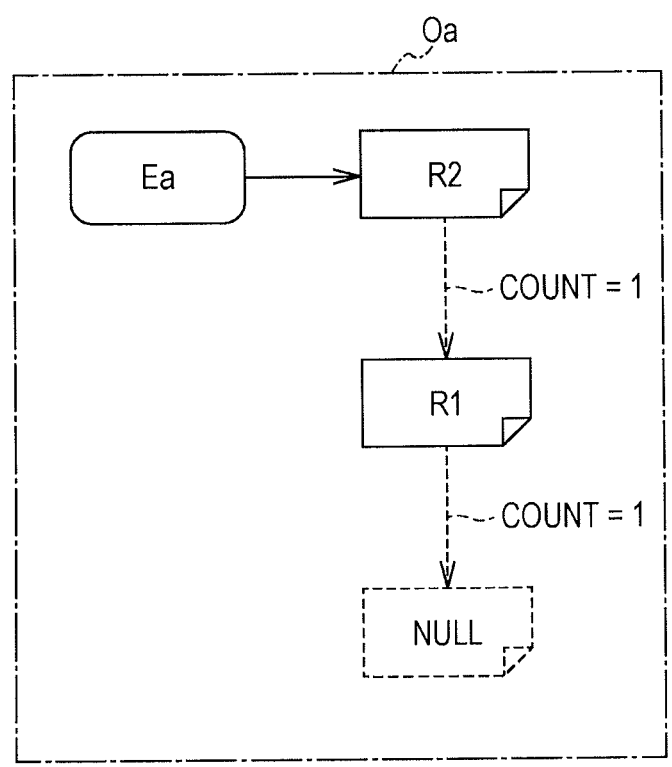
FIG. 10 schematically illustrates an example of the state of the object Oa that is registered.

In this way, the content of the object Oa is changed from C1 to C2. FIG. 10 schematically illustrates an example of the state of the object Oa registered at this time.

Copying Process (Derivative-Type)

Figure 11:
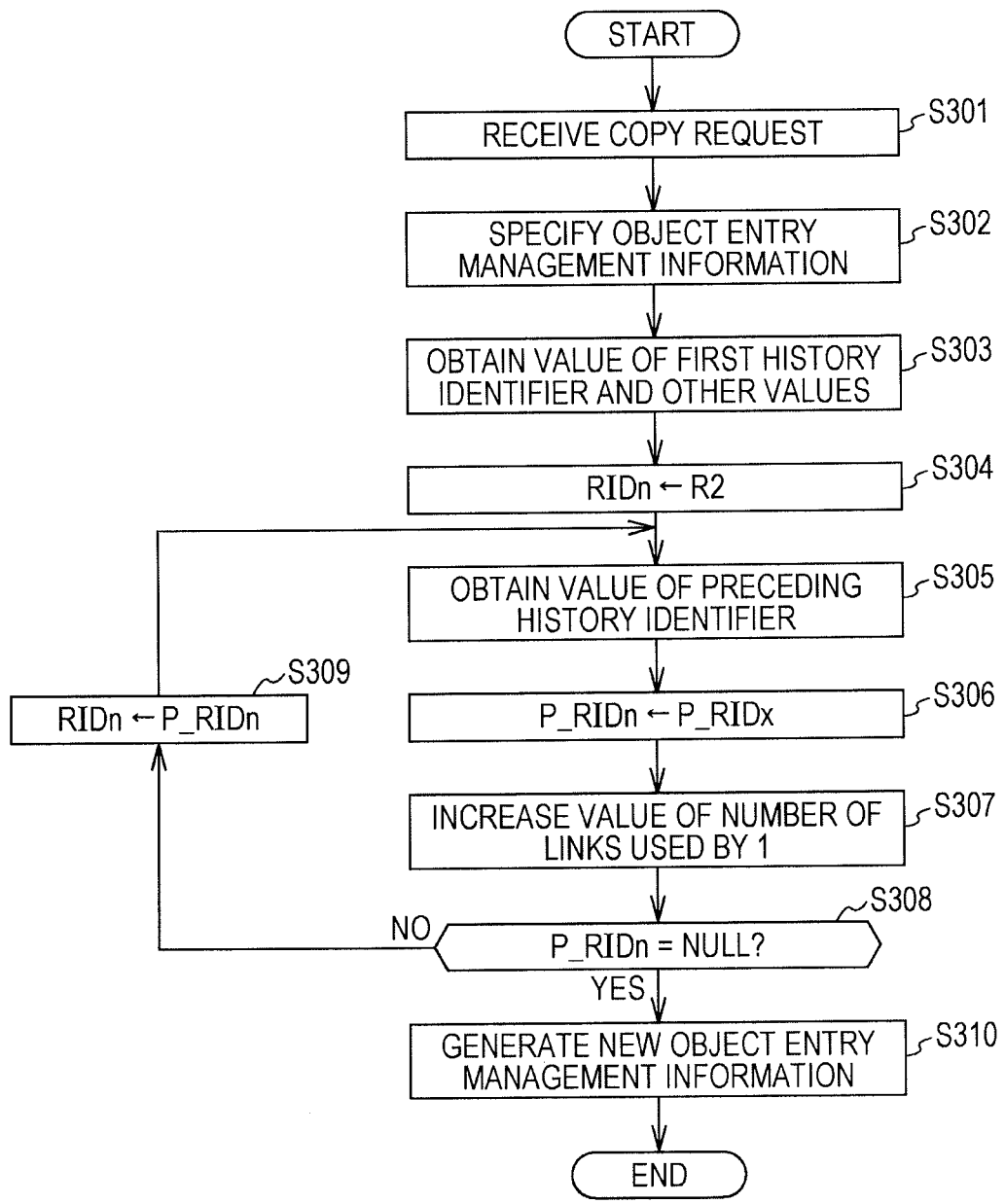
FIG. 11 is a flowchart illustrating an example of a flow of an object information copying process (derivative-type) performed by the information processing apparatus according to the exemplary embodiment.

Next, an example of a flow of a process for copying object information 30, which is performed by the information processing apparatus 12 according to the exemplary embodiment, will be described with reference to a flowchart illustrated in FIG. 11. The description will be given here of an example of a flow of a derivative-type copying process for copying the object Oa. In the illustrated example process, it is assumed that the object Oa is in the state illustrated by way of example in FIG. 10.

First, the process request receiving unit 22 generates an object Ob that is a copy of the object Oa, and receives from a user terminal 14 a request for executing a process for registering the object Ob as child object information 30 of the object Ofb (S301). Then, the process execution unit 24 specifies object entry management information 34 corresponding to the object Oa (in which the object entry identifier EID has the value Ea), and object entry management information 34 corresponding to the object Ofb (in which the object entry identifier EID has the value Efb) (S302).

Then, the process execution unit 24 obtains the value R1 of the first history identifier F_RID, the value R2 of the latest history identifier L_RID, and the value Na of the object name NAME, which are included in the object entry management information 34 corresponding to the object Oa (S303). Then, the process execution unit 24 substitutes the value R2 of the latest history identifier L_RID, which is obtained in the processing of S303, for a variable RIDn (S304).

Then, the process execution unit 24 obtains a value P_RIDx of the preceding history identifier P_RID in the history link management information 36 in which the value of the history identifier RID is equal to the value of the variable RIDn (S305). Then, the process execution unit 24 substitutes the value P_RIDx of the preceding history identifier P_RID, which is obtained in the processing of S305, for a variable P_RIDn (S306).

Then, the change history association controller 26 increases the value of the number of links used COUNT by one, which is included in the history link management information 36 in which the value of the history identifier RID is equal to the value of the variable RIDn and in which the value of the preceding history identifier P_RID is equal to the value of the variable P_RIDn (S307).

Then, the process execution unit 24 checks whether or not the value of the variable P_RIDn is null (S308). If the value of the variable P_RIDn is not null (NO in S308), the process execution unit 24 substitutes the value of the variable P_RIDn for the variable RIDn (S309), and executes the process after the processing of S305.

If the value of the variable P_RIDn is null (YES in S308), the process execution unit 24 generates new object entry management information 34 (S310) in which a new value Eb is set in the object entry identifier EID, the value R1 that is the same as that of the first history identifier F_RID of the object Oa is set in the first history identifier F_RID, the value R2 that is the same as that of the latest history identifier L_RID of the object Oa is set in the latest history identifier L_RID, the value Na that is the same as that of the object name NAME of the object Oa is set in the object name NAME, and the value Efb that is the value of the object entry identifier EID of the object Ofb obtained by the process execution unit 24 in the processing of S302 is set in the parent object entry identifier P_EID.

Figure 12:
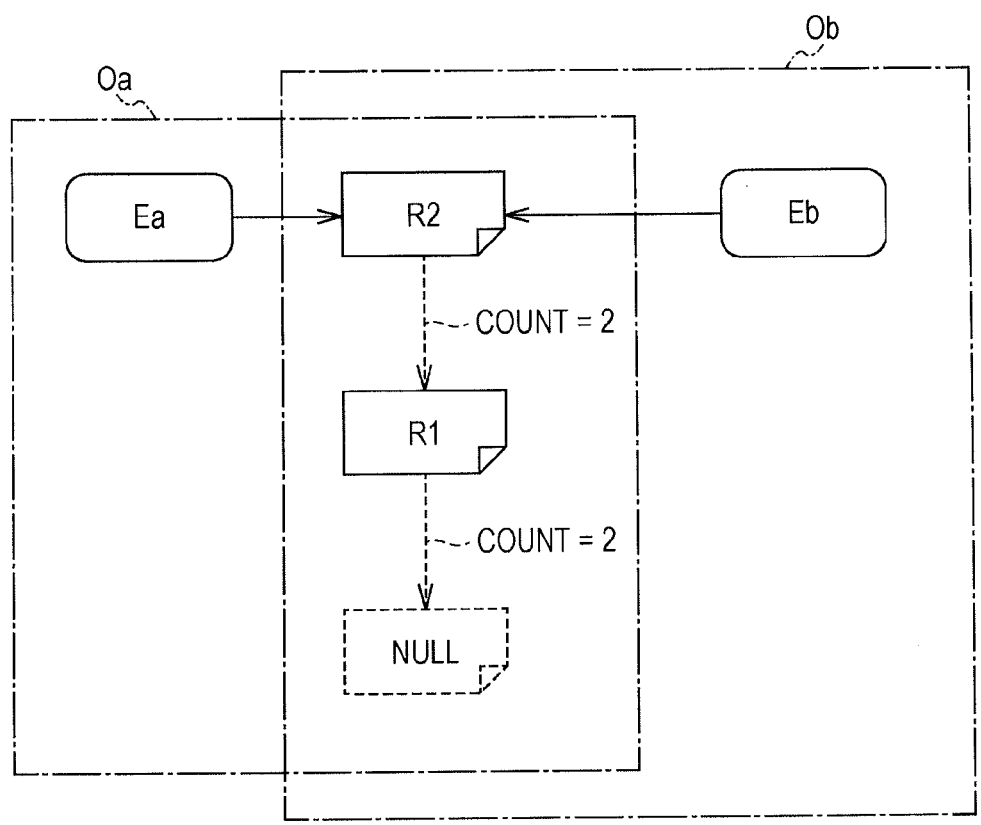
FIG. 12 schematically illustrates an example of the state of the object Oa and an object Ob that are registered.

In this way, the object Ob that is a copy of the object Oa is registered. FIG. 12 schematically illustrates an example of the state of the object Oa and the object Ob that are registered at this time. In this case, as illustrated by way of example in FIG. 12, the objects Oa and Ob share the change histories R1 and R2. The object Ob has the content C2 that is the same as that of the object Oa.

Figure 13:
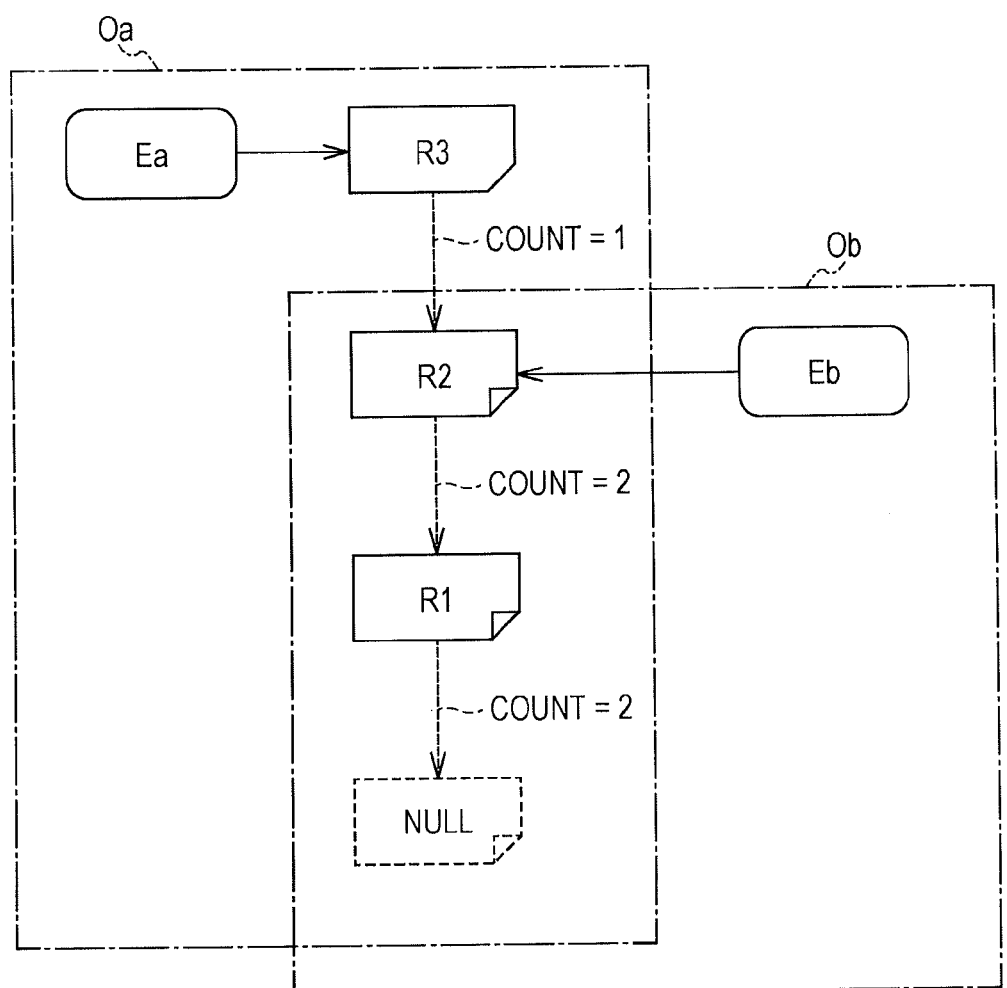
FIG. 13 schematically illustrates an example of the state of the object Oa and the object Ob that are registered.

In the state of the registered object information 30 illustrated by way of example in FIG. 12, if the information processing apparatus 12 according to this exemplary embodiment executes a process for changing the content of the object Oa from C2 to C3, which is similar to the processing of S201 to S206 described above by way of example, a state of the registered object information 30 illustrated by way of example in FIG. 13 is obtained. In the state of the registered object information 30 illustrated in by way of example in FIG. 13, if the information processing apparatus 12 according to this exemplary embodiment further executes a process for changing the content of the object Ob from C2 to C4, which is similar to the processing of S201 to S206 described above by way of example, a state of the registered object information 30 illustrated by way of example in FIG. 14 is obtained.

Figure 14:
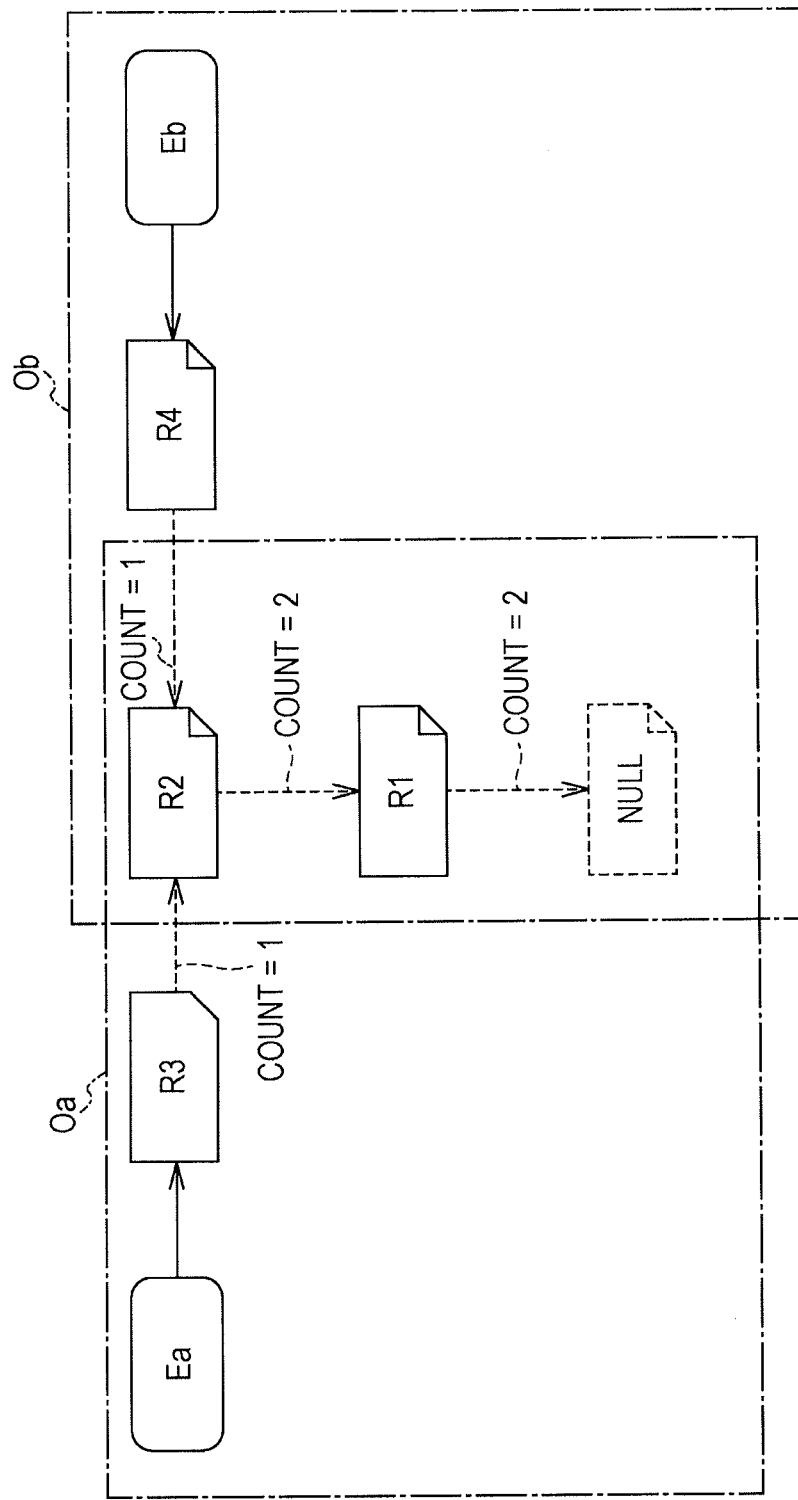
FIG. 14 schematically illustrates an example of the state of the object Oa and the object Ob that are registered.
Figure 15:
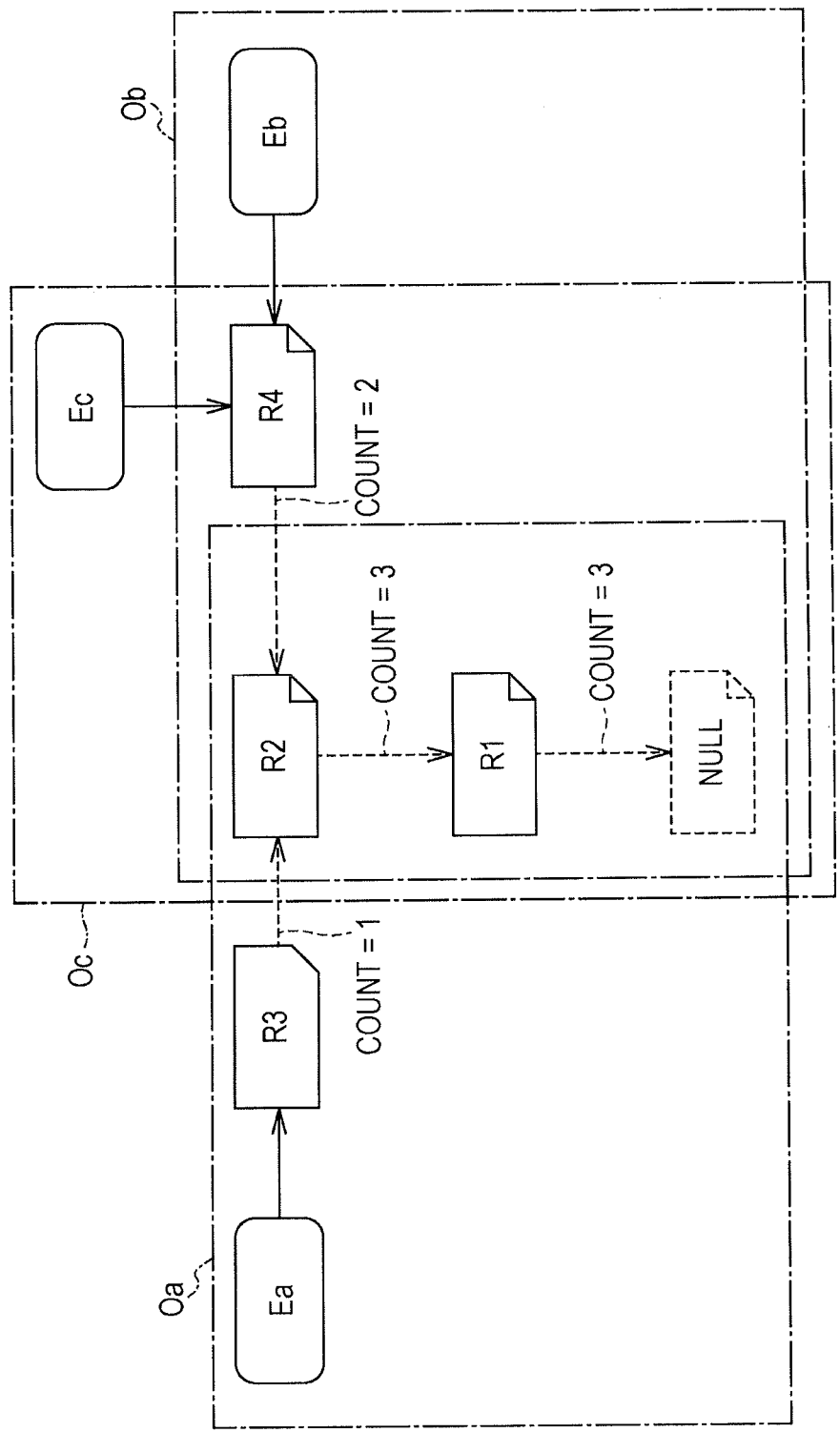
FIG. 15 schematically illustrates an example of the state of the object Oa, the object Ob, and an object Oc that are registered.

In the state of the registered object information 30 illustrated by way of example in FIG. 14, if the information processing apparatus 12 according to this exemplary embodiment further executes a process for registering an object Oc that is a copy of the object Ob as child object information 30 of the object Ofc (a derivative-type copying process for copying the object Ob), which is similar to the processing of S301 to S309 described above by way of example, a state of the registered object information 30 illustrated by way of example in FIG. 15 is obtained. At the end of this process, the objects Ob and Oc share the change histories R1, R2 and R4. The object Oc has the content C4 that is the same as that of the object Ob.

Figure 16:
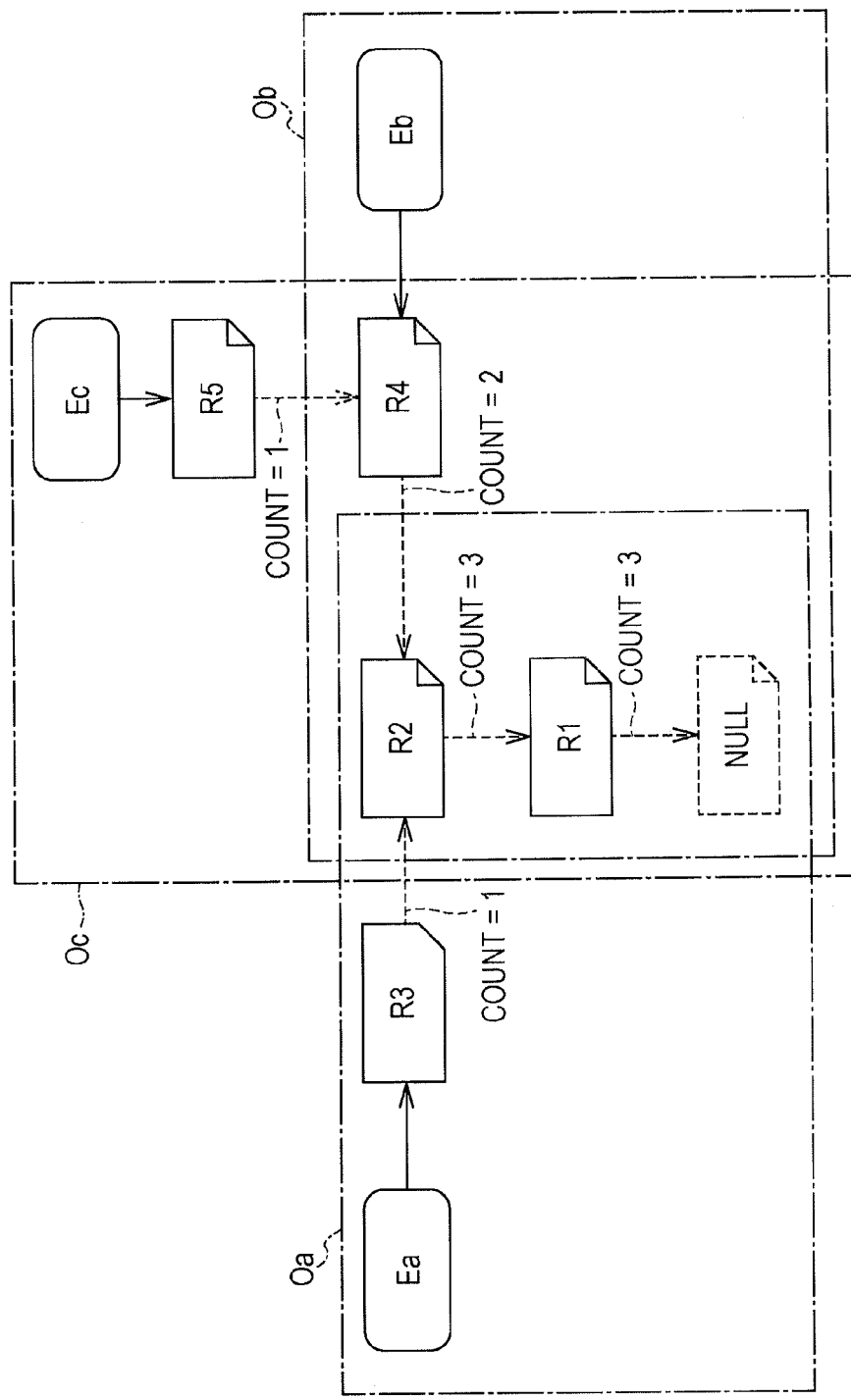
FIG. 16 schematically illustrates an example of the state of the object Oa, the object Ob, and the object Oc that are registered.

In the state of the registered object information 30 illustrated by way of example in FIG. 15, if the information processing apparatus 12 according to this exemplary embodiment further executes a process for changing the content of the object Oc from C4 to C5, which is similar to the processing of S201 to S206 described above by way of example, a state of the registered object information 30 illustrated by way of example in FIG. 16 is obtained.

Figure 17:
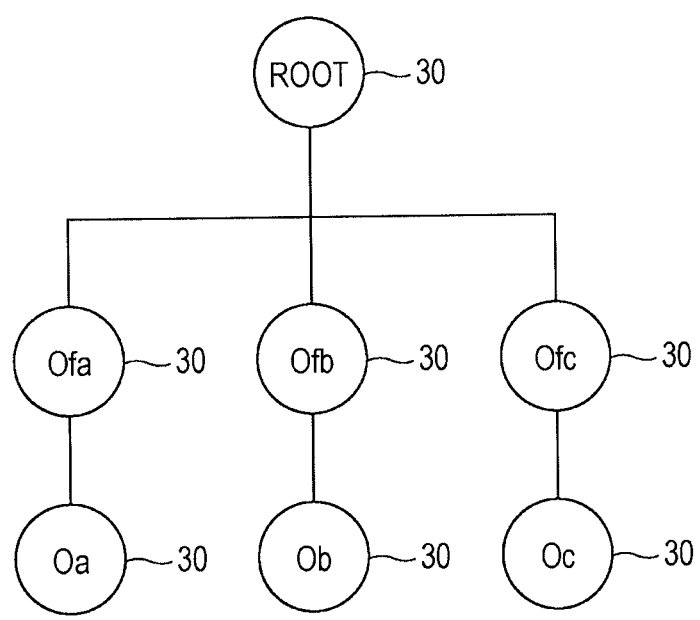
FIG. 17 schematically illustrates an example of object information.

FIG. 17 schematically illustrates an example of the object information corresponding to the registered object information 30 illustrated by way of example in FIG. 16. FIG. 18 illustrates an example of the change history content management information 32 corresponding to the object information 30 illustrated by way of example in FIG. 16. FIG. 19 illustrates an example of the object entry management information 34 corresponding to the registered object information 30 illustrated by way of example in FIG. 16. FIG. 20 illustrates an example of the history link management information 36 corresponding to the registered object information 30 illustrated by way of example in FIG. 16.

Deletion Process

Figure 21A:
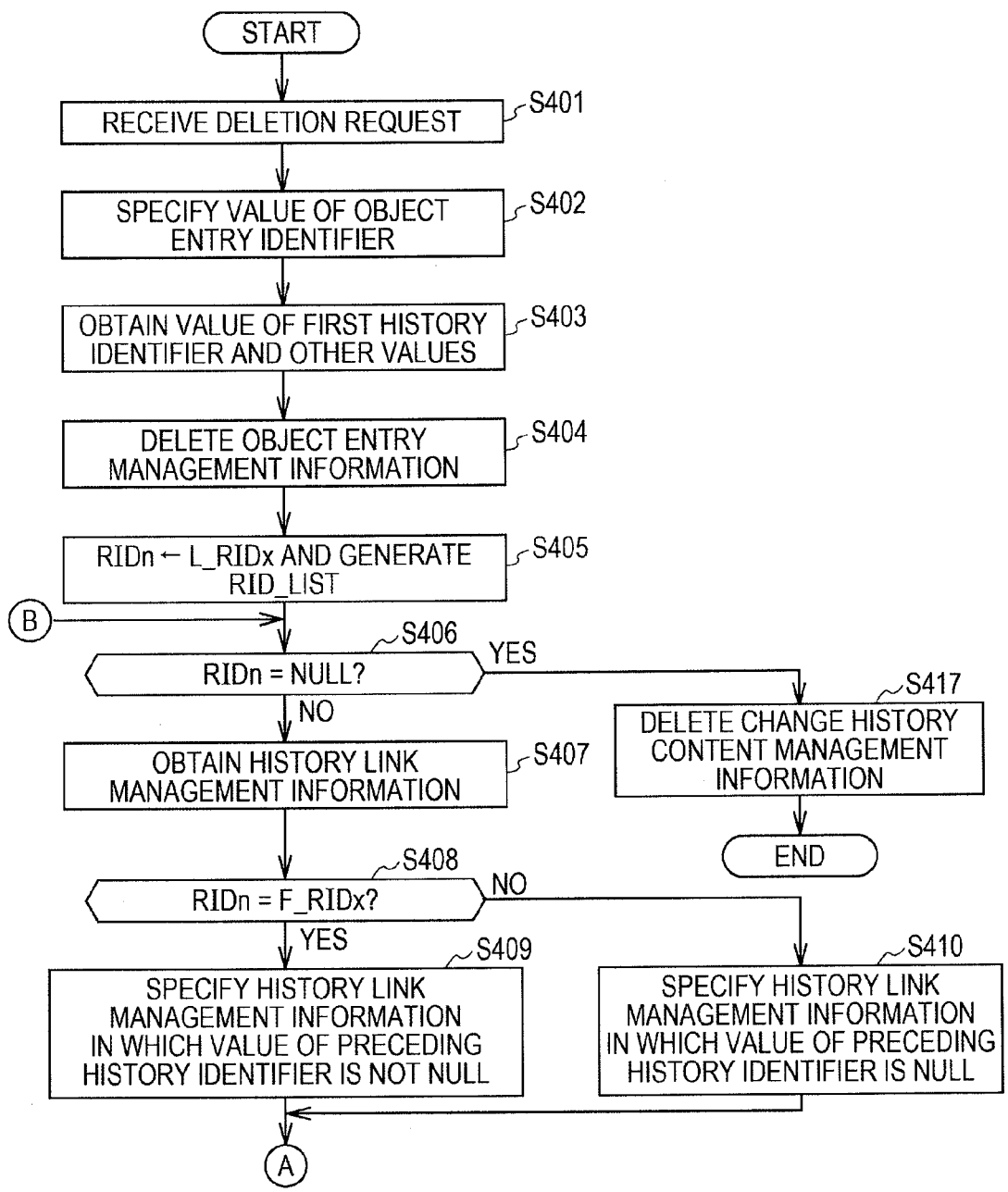
FIGS. 21A and 21B are flow diagrams illustrating an example of a flow of an object information deletion process performed by the information processing apparatus according to the exemplary embodiment.
Figure 21B:
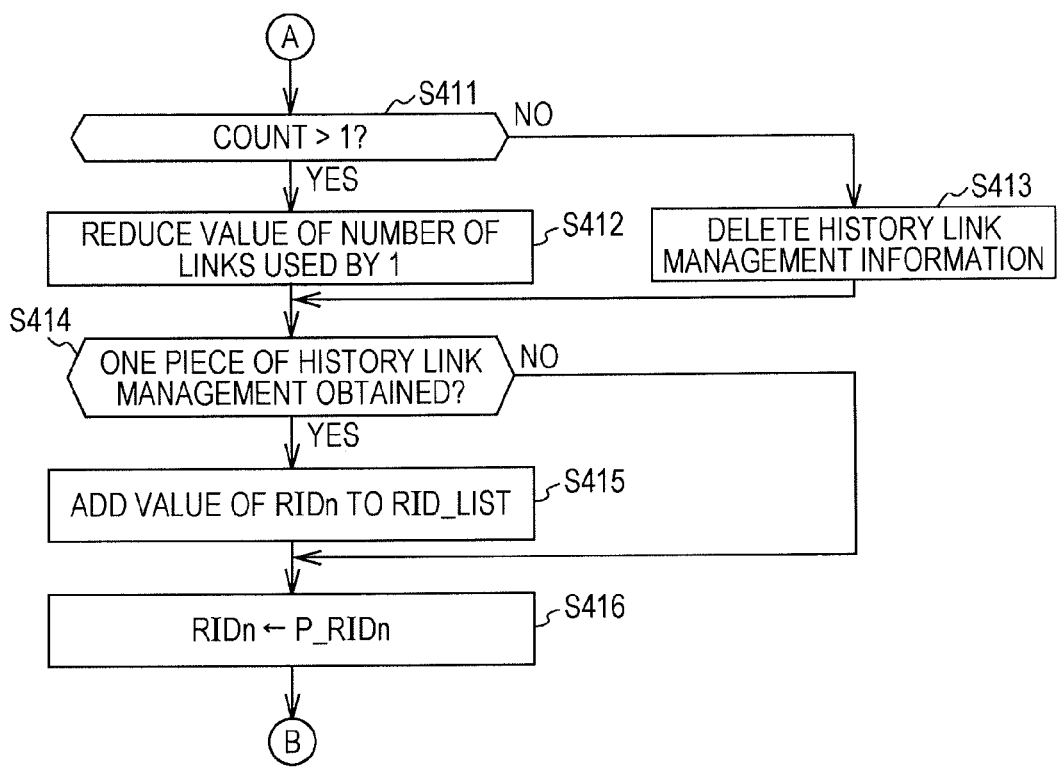

Next, an example of a flow of a process for deleting object information 30, which is performed by the information processing apparatus 12 according to this exemplary embodiment, will be described with reference to a flowchart illustrated in FIGS. 21A and 21B. The description will be given here of an example of a flow of a process for deleting an object Ox (where Ox is Oa, Ob, or Oc). In the illustrated example process, it is assumed that the objects Oa, Ob, and Oc have been registered in the state illustrated by way of example in FIG. 16.

First, the process request receiving unit 22 receives from a user terminal 14 a request for deleting an object Ox (S401). Then, the process execution unit 24 specifies a value Ex of the object entry identifier EID in the object entry management information 34 corresponding to the object Ox (S402). Then, the process execution unit 24 obtains a value F_RIDx of the first history identifier F_RID and a value L_RIDx of the latest history identifier L_RID, which are included in the object entry management information 34 in which the object entry identifier EID has the value Ex (S403). Then, the process execution unit 24 deletes the object entry management information 34 in which the object entry identifier EID has the value Ex (S404). Then, the process execution unit 24 substitutes the value L_RIDx for the variable RIDn, and further generates an array variable RID_LIST having an empty value (S405).

Then, the process execution unit 24 checks whether or not the value of the variable RIDn is null (S406). If the value of the variable RIDn is not null (NO in S406), the process execution unit 24 obtains all the pieces of history link management information 36 in which the value of the history identifier RID is equal to the variable RIDn as processing target candidates (S407).

Then, the process execution unit 24 checks whether or not the value of the variable RIDn is F_RIDx (S408). If the value of the variable RIDn is F_RIDx (YES in S408), the process execution unit 24 specifies, as processing target history link management information 36, history link management information 36 in which the value of the preceding history identifier P_RID is not null among the pieces of history link management information 36 obtained as processing target candidates in the processing of S407 (S409). If the value of the variable RIDn is not F_RIDx (NO in S408), the process execution unit 24 specifies, as processing target history link management information 36, history link management information 36 in which the value of the preceding history identifier P_RID is null among the pieces of history link management information 36 obtained as processing target candidates in the processing of S407 (S410).

Then, the change history association controller 26 checks whether or not the value of the number of links used COUNT included in the processing target history link management information 36 is greater than 1 (S411). If the value is greater than 1 (YES in S411), the change history association controller 26 decreases the value of the number of links used COUNT by 1 (S412). If the value is equal to 1 (NO in S411), the change history deletion unit 28 deletes the processing target history link management information 36 (S413).

Then, the process execution unit 24 checks whether or not the number of pieces of history link management information 36 obtained as processing target candidates in the processing of S407 is 1 (S414). If the number of pieces of history link management information 36 is 1 (YES in S414), the value of the variable RIDn is added to the array variable RID_LIST (S415). If the number of pieces of history link management information 36 is not 1 (NO in S414) or after the completion of the processing of S415, the process execution unit 24 substitutes the value of the variable P_RIDn of the preceding history identifier P_RID, is included in the processing target history link management information 36, for the variable RIDn (S416), and executes the processing of S406 and the following processing.

If it is confirmed in the processing of S406 that the value of the variable RIDn is null (YES in S406), the change history deletion unit 28 deletes change history content management information 32 in which the history identifier RID has the same value as one of the variables RIDn included in the array variable RID_LIST (S417).

As described above, the change history deletion unit 28 deletes a change history that is not associated with the original object information 30 or any copied object information 30.

For example, in the state of the registered object information 30 illustrated by way of example in FIG. 16, if the information processing apparatus 12 deletes the object Ob in accordance with the example process described above, the object entry management information 34 in which the object entry identifier EID has the value Eb is deleted. Further, the value of the number of links used COUNT in the history link management information 36 in which the combinations {RID, P_RID} are {R4, R2}, {R2, R1}, and {R1, null} decreases by 1. In this case, the change history content management information 32 is not changed.

Here, if the information processing apparatus 12 further deletes the object Oc in accordance with the process illustrated in the example process described above, the object entry management information 34 in which the object entry identifier EID has the value Ec is deleted. Further, the value of the number of links used COUNT in the history link management information 36 in which the combinations {RID, P_RID} are {R2, R1} and {R1, null} decreases by 1. Further, the history link management information 36 in which the combinations {RID, P_RID} are {R5, R4} and {R4, R2} is deleted. Further, the change history content management information 32 in which the history identifier RID has the values R5 and R4 is deleted.

Here, if the information processing apparatus 12 further deletes the object Oa in accordance with the process illustrated in the example process described above, the object entry management information 34 in which the object entry identifier EID has the value Ea is deleted. Further, the history link management information 36 in which the combinations {RID, P_RID} are {R3, R2}, {R2, R1}, and {R1, null} is deleted. Further, the change history content management information 32 in which the history identifier RID has the values R3, R2, and R1 is deleted.

History Association Releasing Process

Figure 22A:
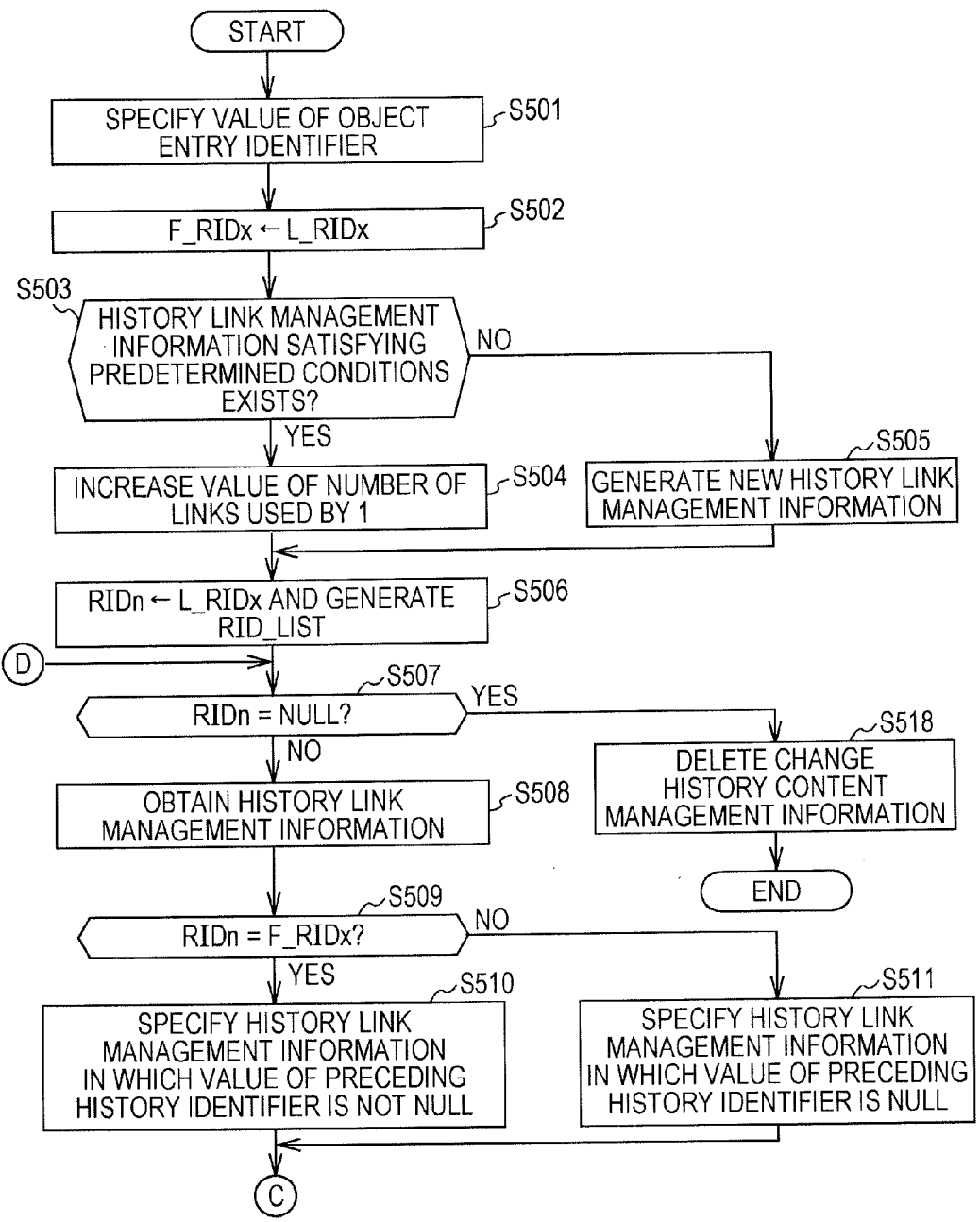
FIGS. 22A and 22B are flowcharts illustrating an example of a flow of a history association releasing process performed by the information processing apparatus according to the exemplary embodiment.
Figure 22B:
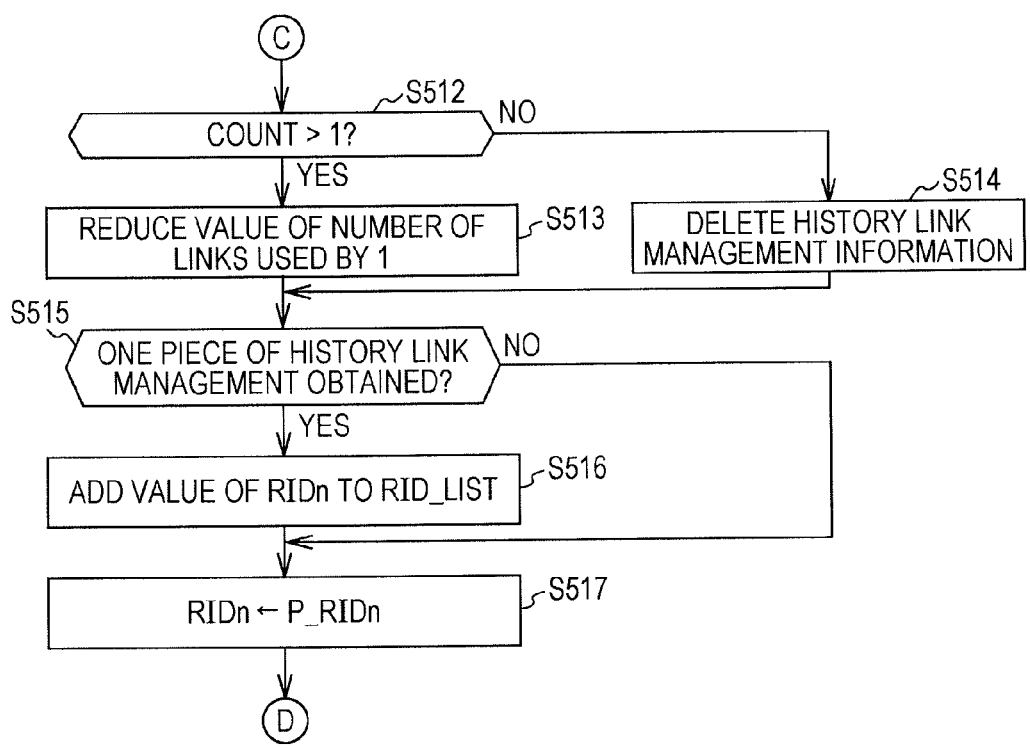

Next, an example of a history association releasing process performed by the information processing apparatus 12 according to this exemplary embodiment will be described with reference to a flowchart illustrated in FIGS. 22A and 22B. The description will be given here of an example of a process for releasing the association between an object Ox (where Ox is Oa, Ob, or Oc) and a change history of the object Ox. In the illustrated example process, it is assumed that the objects Oa, Ob, and Oc have been registered in the state illustrated by way of example in FIG. 16.

First, the change history association controller 26 specifies the value Ex of the object entry identifier EID in the object entry management information 34 corresponding to the object Ox (S501). Then, the change history association controller 26 changes the value F_RIDx of the first history identifier F_RID, which is included in the object entry management information 34 in which the object entry identifier EID has the value Ex, to the value L_RIDx of the latest history identifier L_RID (S502). At this time, the value of the first history identifier F_RID, which is included in the object entry management information 34 in which the object entry identifier EID has the value Ex, is the same as the value of the latest history identifier L_RID.

Then, the change history association controller 26 checks whether or not history link management information 36 satisfying the conditions that the history identifier RID has the value L_RIDx and the preceding history identifier P_RID has a value "null" exists (S503). If history link management information 36 satisfying the above conditions exists (YES in S503), the value of the number of links used COUNT included in the history link management information 36 is increased by 1 (S504). If history link management information 36 satisfying the above conditions does not exist (NO in S503), new history link management information 36 in which the value of the history identifier RID is set to L_RIDx, the value of the preceding history identifier P_RID is set to null, and the value of the number of links used COUNT is set to 1 is generated (S505).

Then, the process execution unit 24 substitutes the value L_RIDx for the variable RIDn, and further generates an array variable RID_LIST having an empty value (S506).

Then, the process execution unit 24 checks whether or not the value of the variable RIDn is null (S507). If the value of the variable RIDn is not null (NO in S507), the process execution unit 24 obtains all the pieces of history link management information 36 in which the value of the history identifier RID is equal to the variable RIDn as processing target candidates (S508).

Then, the process execution unit 24 checks whether or not the value of the variable RIDn is F_RIDx (S509). If the value of the variable RIDn is F_RIDx (YES in S509), the process execution unit 24 specifies, as processing target history link management information 36, history link management information 36 in which the value of the preceding history identifier P_RID is not null among the pieces of history link management information 36 obtained as processing target candidates in the processing of S508 (S510). If the value of the variable RIDn is not F_RIDx (NO in S509), the process execution unit 24 specifies, as processing target history link management information 36, history link management information 36 in which the value of the preceding history identifier P_RID is null among the pieces of history link management information 36 obtained as processing target candidates in the processing of S508 (S511).

Then, the change history association controller 26 checks whether or not the value of the number of links used COUNT included in the processing target history link management information 36 is greater than 1 (S512). If the value is greater than 1 (YES in S512), the change history association controller 26 decreases the value of the number of links used COUNT by 1 (S513). If the value is equal to 1 (NO in S512), the change history deletion unit 28 deletes the processing target history link management information 36 (S514).

Then, the process execution unit 24 checks whether or not the number of pieces of history link management information 36 obtained as processing target candidates in the processing of S407 is 1 (S515). If the number of pieces of history link management information 36 is 1 (YES in S515), the value of the variable RID_n is added to the array variable RID_LIST (S516). If the number of pieces of history link management information 36 is not 1 (NO in S515) or after the completion of the processing of S516, the process execution unit 24 substitutes the value of the variable P_RIDn of the preceding history identifier P_RID, which is included in the processing target history link management information 36, for the variable RIDn (S517), and executes the processing of S507 and the following processing.

If it is confirmed in the processing of S507 that the value of the variable RIDn is null (YES in S507), the change history deletion unit 28 deletes change history content management information 32 in which the history identifier RID has the same value as one of the variables RIDn included in the array variable RID_LIST (S518).

As described above, the change history deletion unit 28 deletes a change history that is not associated with the original object information 30 or any copied object information 30.

For example, in the state of the registered object information 30 illustrated by way of example in FIG. 16, if the information processing apparatus 12 executes the processing of S501 to S518 described above by way of example on the object Ob, the value of the first history identifier F_RID of the object entry management information 34 in which the object entry identifier EID has the value Eb is set to R4. Further, the value of the number of links used COUNT in the history link management information 36 in which the combinations {RID, P_RID} are {R4, R2}, {R2, R1}, and {R1, null} decreases by 1. Further, new history link management information 36 in which the combination {RID, P_RID} is {R4, null} is registered. In this case, the change history content management information 32 is not changed.

Here, if the information processing apparatus 12 further executes the processing of S501 to S518 described above by way of example on the object Oc, the value of the first history identifier F_RID in the object entry management information 34 in which the object entry identifier EID has the value Ec is set to R5. Further, the value of the number of links used COUNT in the history link management information 36 in which the combinations {RID, P_RID} are {R2, R1} and {R1, null} decreases by 1. Further, the history link management information 36 in which the combinations {RID, P_RID} are {R5, R4} and {R4, R2} is deleted. Further, new history link management information 36 in which the combination {RID, P_RID} is {R5, null} is registered. In this case, the change history content management information 32 is not changed.

Here, if the information processing apparatus 12 further executes the processing of S501 to S518 described above by way of example on the object Oa, the value of the first history identifier F_RID in the object entry management information 34 in which the object entry identifier EID has the value Ea is set to R3. Further, the history link management information 36 in which the combinations {RID, P_RID} are {R3, R2}, {R2, R1}, and {R1, null} is deleted. Further, new history link management information 36 in which the combination of {RID, P_RID} is {R3, null} is registered. Further, the change history content management information 32 in which the history identifier RID has the values R2 and R1 is deleted.

Copying Process (Use-Type)

Next, an example of a use-type copying process performed by the information processing apparatus 12 according to this exemplary embodiment will be described. In the illustrated example process, it is assumed that the objects Oa, Ob, and Oc have been registered in the state illustrated by way of example in FIG. 16. The description will be given here of an example in which an object Ox (where Ox is Oa, Ob, or Oc) is copied and an example of a process for changing the name of the copied object to Nx.

In this exemplary embodiment, for example, when the process request receiving unit 22 receives from a user terminal 14 a request for performing a process of copying the object Ox and changing the name of the object Ox to Nx, first, the information processing apparatus 12 executes a process similar to the processing of S301 to S310 described above by way of example. Then, the process execution unit 24 changes the value of the object name NAME included in the object entry management information 34 corresponding to the copied object to Nx. Then, the change history association controller 26 determines that the copying process is a use-type copying process. Then, in accordance with the determination result of a use-type copying process, the information processing apparatus 12 executes a history association releasing process similar to the processing of S501 to S518 described above by way of example.

In this way, in this exemplary embodiment, if the process execution unit 24 executes a process for generating a copied object and changing the name of the copied object, the change history association controller 26 determines that the process is a use-type copying process, and releases the association between the copied object and the change history or histories of the copied object.

History List Output Process

Figure 23:
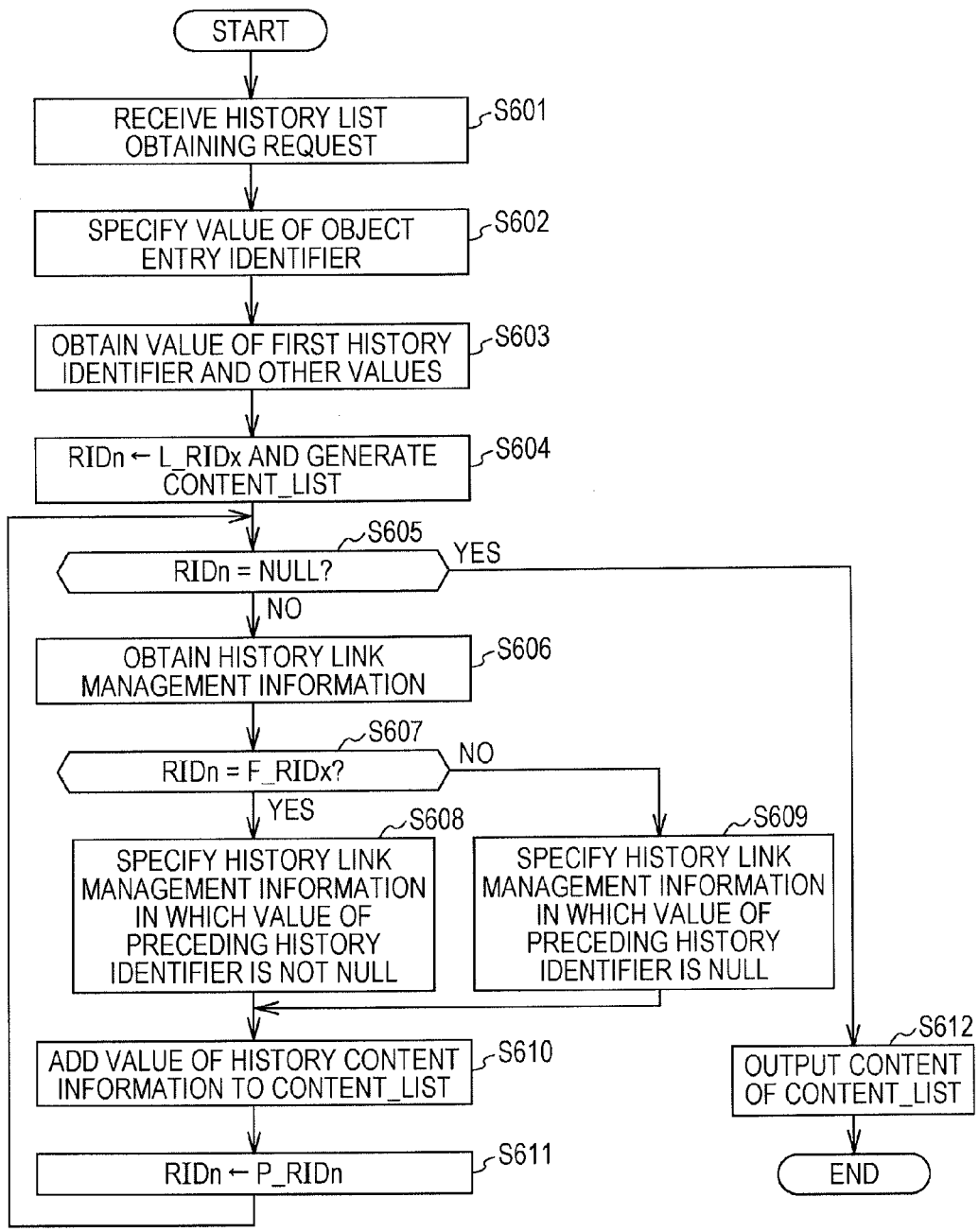
FIG. 23 is a flowchart illustrating an example of a flow of a history list output process performed by the information processing apparatus according to the exemplary embodiment.

Next, an example of a process for outputting a history list of an object Ox that is an example of object information 30 (where Ox is Oa, Ob, or Oc), which is performed by the information processing apparatus 12 according to the exemplary embodiment, will be described with reference to a flowchart illustrated in FIG. 23. In the illustrated example process, it is assumed that the objects Oa, Ob, and Oc have been registered in advance in the state illustrated by way of example in FIG. 16.

First, the process request receiving unit 22 receives from a user terminal 14 a request for obtaining a history list of the object Ox (S601). Then, the process execution unit 24 specifies the value Ex of the object entry identifier EID corresponding to the object Ox (S602). Then, the process execution unit 24 obtains the value F_RIDx of the first history identifier F_RID and the value L_RIDx of the latest history identifier L_RID, which are included in the object entry management information 34 in which the object entry identifier EID has the value Ex (S603). Then, the process execution unit 24 substitutes the value L_RIDx for the variable RIDn, and further generates an array variable CONTENT_LIST having an empty value (S604).

Then, the process execution unit 24 checks whether or not the value of the variable RIDn is null (S605). If the value is not null (NO in S605), the process execution unit 24 obtains as processing target candidates all the pieces of history link management information 36 in which the value of the history identifier RID is equal to the variable RIDn (S606).

Then, the process execution unit 24 checks whether or not the value of the variable RIDn is F_RIDx (S607). If the value of the variable RIDn is F_RIDx (YES in S607), history link management information 36 in which the value of the preceding history identifier P_RID is not null among the pieces of history link management information 36 obtained as processing target candidates in the processing of S606 is specified as processing target history link management information 36 (S608). If the value of the variable RIDn is not F_RIDx (NO in S607), history link management information 36 in which the value of the preceding history identifier P_RID is null among the pieces of history link management information 36 obtained as processing target candidates in the processing of S606 is specified as processing target history link management information 36 (S609).

Then, the process execution unit 24 adds the value of the history content information CONTENT included in the change history content management information 32 in which the value of the history identifier RID is equal to the variable RIDn to the array variable CONTENT_LIST (S610).

Then, the process execution unit 24 substitutes the value of the variable P_RIDn of the preceding history identifier P_RID, which is included in the processing target history link management information 36 specified in the processing of S608 or S609, for the variable RIDn (S611), and executes the processing of S605 and the following processing.

If it is confirmed in the processing of S605 that the value of the variable RIDn is null (YES in S605), the process execution unit 24 outputs the content of the array variable CONTENT_LIST to the user terminal 14 (S612).

Upon receipt of the content of the array variable CONTENT_LIST from the information processing apparatus 12, the user terminal 14 displays and outputs the values of the pieces of history content information CONTENT included in the array variable CONTENT_LIST on a display.

It is to be understood that the present invention is not limited to the exemplary embodiment described above.

For example, the information processing apparatus 12 may not necessarily execute the processing of S411 to S413 described above by way of example. Instead of this, the change history association controller 26 may decrease the value of the number of links used COUNT included in the processing target history link management information 36 by 1 regardless of the value of the number of links used COUNT included in the processing target history link management information 36. Then, the change history deletion unit 28 may delete history link management information 36 in which the value of the number of links used COUNT is "0" at predetermined time intervals (for example, at a certain time every day).

Furthermore, for example, the information processing apparatus 12 may not necessarily execute the processing of S512 to S514 described above by way of example. Instead of this, the change history association controller 26 may decrease the value of the number of links used COUNT included in the processing target history link management information 36 by 1 regardless of the value of the number of links used COUNT included in the processing target history link management information 36. Then, the change history deletion unit 28 may delete history link management information 36 in which the value of the number of links used COUNT is "0" at predetermined time intervals (for example, at a certain time every day).

Furthermore, for example, when the process execution unit 24 executes a process for changing an attribute other than the name of object information 30 or a process for changing the content of object information 30, the change history association controller 26 may execute a process similar to the processing of S501 to S518 described above by way of example, and may release the association between the object information 30 and the change history or histories of the object information 30.

Furthermore, for example, when the process execution unit 24 executes a process for copying object information 30, if the change history association controller 26 determines that a user associated with the object information 30 (for example, the author or manager of the object information 30) matches a user who has made a request for performing the process for copying the object information 30, a process similar to the processing of S501 to S518 described above by way of example may be executed, and the association between a copy of the object information 30 and the change history or histories of the object information 30 may be released.

Furthermore, for example, the information storage unit 20 may store information associating a user with an organization to which the user belongs. Then, when the process execution unit 24 executes a process for copying object information 30, if the change history association controller 26 determines that a user associated with the object information 30 (for example, the author or manager of the object information 30) and a user who has made a request for performing the process for copying the object information 30 belong to different organizations, a process similar to the processing of S501 to S518 described above by way of example may be executed, and the association between a copy of the object information 30 and the change history or histories of the object information 30 may be released.

Furthermore, for example, the information storage unit 20 may store determination condition information indicating a determination condition. Then, when the process execution unit 24 executes a process on object information 30, the change history association controller 26 may determine whether or not the determination condition indicated by the determination condition information stored in the information storage unit 20 is satisfied. In accordance with a determination result, control may be performed to determine whether or not a copy of the object information 30 and a change history of the object information 30 are to be associated with each other. Furthermore, the information processing apparatus 12 may receive determination condition information from a user terminal 14, and may update the determination condition information stored in the information storage unit 20 to the received determination condition information.

Furthermore, for example, a determination condition may be associated with the type of object information 30 which may be document information. Then, if object information 30 matches the type associated with the determination condition, the change history association controller 26 may perform control to determine whether or not the object information 30 and a change history of the object information 30 are to be associated with each other in accordance with whether or not the object information 30 satisfies the determination condition. Furthermore, for example, a determination condition may be associated with a folder. Then, if object information 30 is document information in the folder associated with the determination condition, the change history association controller 26 may perform control to determine whether or not the object information 30 and a change history of the object information 30 are to be associated with each other in accordance with whether or not the object information 30 satisfies the determination condition.

The specific values and character strings described above are examples, and are not intended in any way to limit the scope of claimed subject matter.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process comprising:
   receiving a request to copy an original electronic document;
   copying the original electronic document in accordance with the received request;
   determining whether a type of the copying request is a derivative-type copying request to create a new version of the electronic document or a use-type copying request to create a new electronic document from the original electronic document; and
   associating the copied original electronic document with a change history of the original electronic document indicating a history of processes performed on the original electronic document in response to determining that the type of the copying request is the derivative-type copying request and associating the copied original electronic document with a new change history in response to determining that the type of the copying request is the use-type copying request.

2. An information processing apparatus comprising:
   a process request receiving unit that receives a request to copy an original electronic document;
   a process execution unit that copies the original electronic document in accordance with the request received by the process request receiving unit; and
   an association controller that associates the copied original electronic document with a change history of the original electronic document indicating a history of processes performed on the original electronic document in response to determining that the type of the copying request is the derivative-type copying request and associates the copied original electronic document with a new change history in response to determining that the type of the copying request is the use-type copying request.

3. An image processing method comprising:
receiving a request to copy an original electronic document;
copying the original electronic document in accordance with the received request;
determining whether a type of the copying request is a derivative-type copying request to create a new version of the electronic document or a use-type copying request to create a new electronic document from the original electronic document; and
associating the copied original electronic document with a change history of the original electronic document indicating a history of processes performed on the original electronic document in response to determining that the type of the copying request is the derivative-type copying request and associating the copied original electronic document with a new change history in response to determining that the type of the copying request is the use-type copying request.

* * * * *